(12) United States Patent
Kowalski et al.

(10) Patent No.: US 11,864,531 B1
(45) Date of Patent: *Jan. 9, 2024

(54) FISH BITE INDICATOR

(71) Applicant: ACTIVE OUTDOORS LLC, Glen Lyon, PA (US)

(72) Inventors: James M. Kowalski, Nanticoke, PA (US); David D. McClanahan, Harleysville, PA (US)

(73) Assignee: ACTIVE OUTDOORS LLC, Glen Lyon, PA (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/134,797

(22) Filed: Dec. 28, 2020

Related U.S. Application Data

(63) Continuation of application No. 16/809,776, filed on Mar. 5, 2020, now Pat. No. 10,874,094.

(51) Int. Cl.
   *A01K 97/12* (2006.01)
   *A01K 87/02* (2006.01)
   *G08B 7/06* (2006.01)

(52) U.S. Cl.
   CPC ............ *A01K 97/125* (2013.01); *A01K 87/02* (2013.01); *G08B 7/06* (2013.01)

(58) Field of Classification Search
   CPC ........ A01K 97/01; A01K 97/10; A01K 97/12; A01K 97/125
   See application file for complete search history.

(56) References Cited

U.S. PATENT DOCUMENTS

| 2,549,694 | A | | 2/1949 | Leyda | |
|---|---|---|---|---|---|
| 2,766,543 | A | * | 10/1956 | Beck | A01K 91/10 43/16 |
| 2,944,360 | A | * | 7/1960 | Green | A01K 91/10 43/16 |
| 3,798,630 | A | | 3/1974 | Crosthwait | |
| 4,458,437 | A | * | 7/1984 | Ou | A01K 97/125 43/17 |
| 4,461,113 | A | * | 7/1984 | Erwin | A01K 97/11 43/15 |
| 4,586,284 | A | * | 5/1986 | Westwood, III | A01K 97/125 43/17.1 |
| 5,010,678 | A | * | 4/1991 | Peck | A01K 97/125 43/17 |

(Continued)

*Primary Examiner* — Peter M Poon
*Assistant Examiner* — Marisa V Conlon
(74) *Attorney, Agent, or Firm* — Invention To Patent Services; Alex Hobson

(57) ABSTRACT

A fish bite indicator utilizes a line retainer coupled to a pivot arm and configured to rotate to bring a pair of electrical contacts into contact with a circuit contact to complete a circuit and activate an indicator light and/or indicator speaker. An indicator speaker may produce a factory set alert sound or a recorded alert sound that a user records to distinguish one fishing pole from another. A user may insert the fishing line a desired amount down into the line wedge seam and the depth of insertion may change when the line is released upon the pivoting of the pivot arm. The fish bite indicator may have a drag knob to change how much line tension is required to move the pivot arm and may have a sensitivity knob that adjusts how far the pivot arm has to rotate before the indicator is activated.

16 Claims, 14 Drawing Sheets

(56) References Cited

U.S. PATENT DOCUMENTS

| | | | | |
|---|---|---|---|---|
| 5,321,391 | A * | 6/1994 | Fox | A01K 97/125 340/573.2 |
| 5,345,708 | A * | 9/1994 | Loyd | A01K 97/10 43/21.2 |
| 5,396,726 | A * | 3/1995 | Zepeda, Sr. | A01K 97/125 43/17 |
| 5,542,205 | A | 8/1996 | Updike | |
| 5,771,624 | A | 6/1998 | Vickery et al. | |
| 5,890,312 | A * | 4/1999 | Ball | A01K 97/01 43/16 |
| 5,903,998 | A | 5/1999 | Hawkins et al. | |
| 6,050,019 | A | 4/2000 | Anderson | |
| 6,094,851 | A | 8/2000 | Guidry | |
| 6,341,443 | B1 | 1/2002 | Watfor et al. | |
| 6,539,662 | B2 | 4/2003 | Heath | |
| 6,772,551 | B1 | 8/2004 | Bielinski, Sr. et al. | |
| 7,086,194 | B1 | 8/2006 | Rueben, Jr. | |
| 7,624,531 | B2 | 12/2009 | Kirby | |
| 7,921,592 | B2 * | 4/2011 | Carelock | A01K 89/08 43/16 |
| 9,095,130 | B2 | 8/2015 | Coulson | |
| 9,504,240 | B1 | 11/2016 | Darwin et al. | |
| 9,894,891 | B2 | 2/2018 | Bryzek | |
| 9,968,079 | B2 * | 5/2018 | Bricko | A01K 97/10 |
| 10,575,511 | B2 | 3/2020 | Schramski | |
| 10,874,094 | B1 * | 12/2020 | Kowalski | A01K 87/007 |
| 2002/0112392 | A1 * | 8/2002 | Heath | A01K 97/11 43/17 |
| 2003/0208947 | A1 | 11/2003 | Cramer | |
| 2004/0124984 | A1 * | 7/2004 | Fuller | A01K 97/10 340/573.2 |
| 2007/0216154 | A1 * | 9/2007 | Casagrande | A01K 97/08 283/61 |
| 2011/0095894 | A1 | 4/2011 | Gibson et al. | |

\* cited by examiner

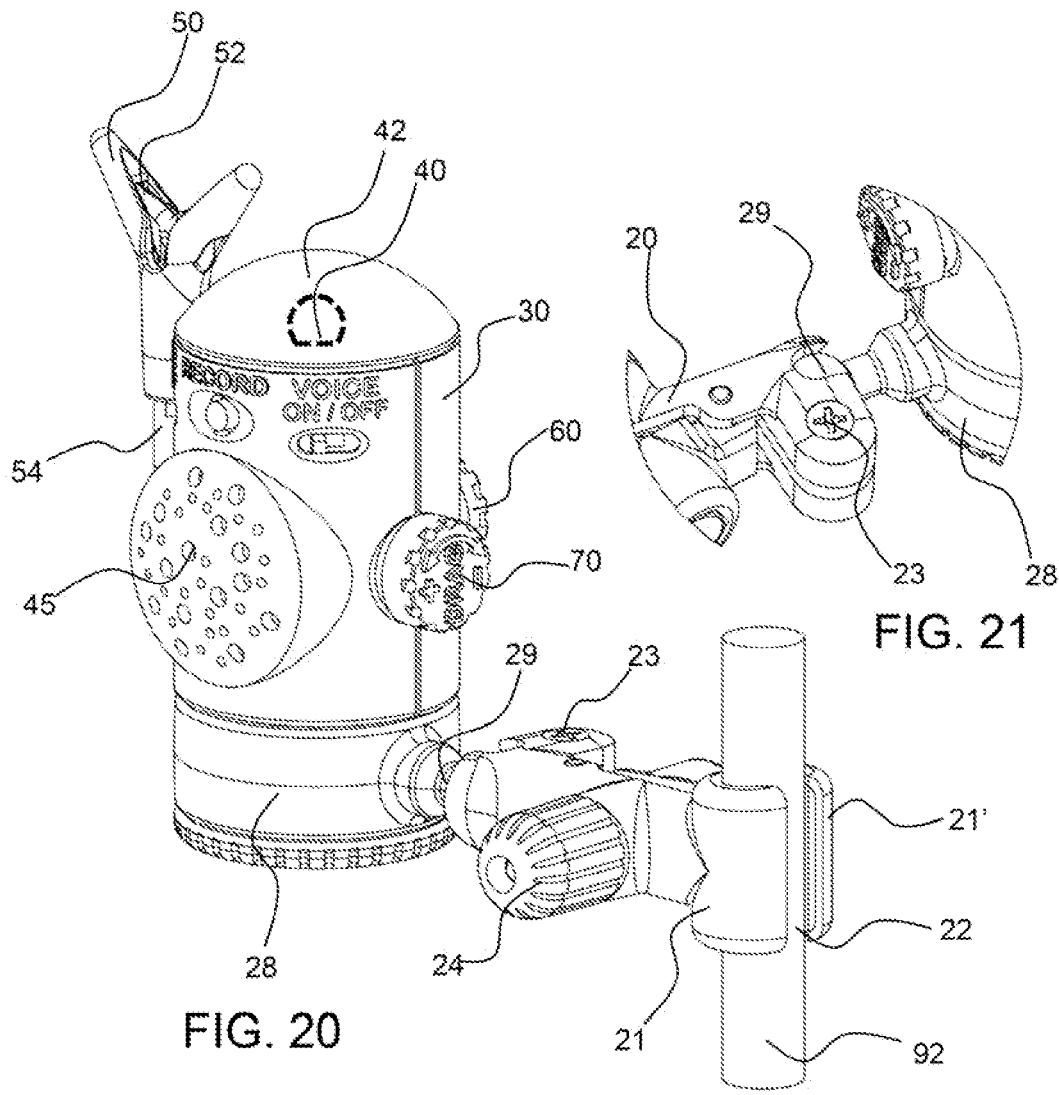

FISH BITE INDICATOR

CROSS REFERENCE TO RELATED APPLICATIONS

This application is a continuation of U.S. patent application Ser. No. 16/809,776, filed on Mar. 5, 2020 and currently pending; the entirety of which is hereby incorporated by reference herein.

BACKGROUND OF THE INVENTION

Field of the Invention

The invention relates to a fish bite indicator having a line retainer arm coupled to a pivot arm and configured to rotate and bring a pair of electrical contacts into contact with a circuit contact to complete a circuit and activate an indicator, such as an indicator light or indicator sound.

Background

Fish bite indicators are often cumbersome to locate in relation to the fishing pole and fishing line. They often are too sensitive and indicate a bite with minimal line tension or are too robust requiring a large force to initiate the indicator. In either event, they can result in the loss of hooked fish. Furthermore, many fish bite indicators require a positive engagement of the fishing line and this can impede reeling in the line. Some fish bite indicators produce a sound and unfortunately, the sounds may be all the same, making it difficult to know which pole has a bite when a plurality of poles and fish bite indicators are used.

SUMMARY OF THE INVENTION

The invention is directed to a fish bite indicator having a line retainer coupled to a pivot arm and configured to rotate and bring a pair of electrical contacts into contact with a circuit contact to complete a circuit and activate an indicator, such as an indicator light or indicator speaker. An indicator light may produce an alert light, such as a constant-on or blinking light. An indicator speaker may produce a factory-set alert sound, such as a beeping or buzzing sound or a recorded alert sound that a user may record to distinguish one fishing pole from another. The line retainer may comprise a line wedge that forms a line wedge seam for receiving the fishing line. A user may insert the fishing line a desired amount down into the line wedge seam, and the depth of insertion may change when the line is released upon the pivoting of the pivot arm. An exemplary fish bite indicator may have a drag knob coupled with the pivot arm to change how much line tension is required to move and pivot the pivot arm. An exemplary fish bite indicator may include a sensitivity knob that adjusts how far the pivot arm has to rotate before the indicator is activated.

An exemplary fish bite indicator has an electrical circuit powered by a battery that is completed when a pair of electrical contacts come into contact with a circuit contact. The pair of electrical contacts may be coupled to the pivot arm and may rotate with the pivot arm. The circuit contact, which is an electrically conductive material to allow current flow between the pair of electrical contacts, may be coupled with the sensitivity knob that can be adjusted to change the indicator angle, or the amount of rotation required of the pivot arm before the electrical contacts contact the circuit contact. In an exemplary embodiment, the circuit contact is a helical spring, or coil spring, coupled to an extended end of a sensitivity knob. The sensitivity knob may rotate into and out of a housing toward the pivot arm and the electrical contacts. Rotating the sensitivity knob into the housing brings the circuit contact spring closer to the electrical contacts and therefore requiring less rotation of the pivot arm to bring the electrical contacts into contact with the circuit contact spring. Conversely, rotating the sensitivity knob outward from the housing and away from the pivot arm increases how far the pivot arm has to rotate before the electrical circuit is complete to result in one of the indicators being activated. Also, a circuit contact spring that extends out from the sensitivity knob is flexible thereby allowing for a softer engagement with the electrical contact and pivot arm so as not to alert the fish thereby aiding in retaining a fish on the line. A wire may extend from the electrical contacts to complete a circuit.

A drag knob may be coupled with the pivot arm and turning of the drag arm may change the tension in the drag spring and therefore change how much line tension is required to pivot the pivot arm. In an exemplary embodiment, the line retainer is on one side of the housing and the pivot arm extends though the housing toward the opposing side wherein the drag knob is configured.

An indicator may be an indicator light that is configured to produce a steady-on or flashing alert light. The alert light may be illuminated or flash for an effective amount of time such as for about 5 or more seconds, about 10 or more seconds, about 30 seconds or more and any range between and including the times provided. In an exemplary embodiment, an indicator light is configured under a light cover that extends over the top of the housing. An indicator light may be any suitable color and may produce an effective amount of lumen for an angler to be alerted when it is turned on. An exemplary indicator light may be a light-emitting diode, incandescent and the like.

An indicator may be an indicator speaker configured to produce an alert sound such as a factory alert sound or a recorded sound. A factory alert sound may be a beeping noise for example. An exemplary fish bite indicator may comprise an alert sound recording feature wherein the user can press a record button, or move a record switch, to record a recorded alert sound, such as "Bob, you have a bite." An exemplary voice on/off switch may allow a user to select the recorded alert sound over the factory alert sound. The recorded alert sound may play one or more times each time the circuit is completed by the pivot arm being pulled by a fish bite. For example, the phrase "Bob, you have a bite," may be repeated two or more times with a delay time therebetween. The alert sound may be played for an effective amount of time such as for about 5 or more seconds, or about 10 or more seconds, about 30 seconds or more and any range between and including the times provided. An alert speaker may be configured within the housing and one or more apertures through the housing may allow for the sound to be emitted from the housing. Note that an angler may record silence and then switch on the voice on/off button to eliminate any audible alerts when the circuit is completed.

The line retainer may be Y-shaped and the line wedge may be configured in the bottom of the Y-shaped line retainer. An exemplary line wedge may be detachably attachable to the line retainer and may be a soft material that allows for effective engagement and retention of the fishing line. The line wedge may be an elastomeric material, for example, such as silicone, urethane or rubber, for example. The line wedge may have a shore 00 value of 100 or less and preferably 80 or less, or a shore A of about 90 or less. The line wedge may form a line wedge seam, such as by being folded down into the line retainer. The fishing line may be retained in the line wedge by being inserted down into the line wedge seam. For rough water, such as surf fishing, a user may press the fishing line further down into the line wedge seam and they may increase the drag, thereby reducing false alarms due to waves pulling on the line. However, when fishing with live bait, especially with a bobber, a lower depth of the fishing line into the line wedge and a lower drag may be preferred. In addition, the line retainer may swivel about the pivot arm to accommodate variation in line alignment such as when the angler picks up the pole after a fish strike indication, as indicated by the large arced arrow in FIG. 1.

A portion of the line retainer may be photoluminescent, "glow-in-the-dark," and motion of the line retainer as the pivot arm rotates may be a secondary visual alert of a fish bite. An angler may notice the line retainer moving or twitching prior to the arm being pulled down and the circuit being completed to produce the light and/or sound alert. This may give the angler some time to move into position to set the hook and reel in the fish. The line wedge may be photoluminescent.

An exemplary fish bite indictor has a clamp for securing the housing to the fishing pole or to a secondary fixed item, such as a fish stand. An exemplary clamp may be detachably attachable to a clamp mount that extends from the housing. A clamp mount may be curved or spherical in shape allowing for multi-directional adjustment of the clamp, with respect to the housing. A camp may have a clamp mount coupling, such as a spherical recess configured to couple with the clamp mount. A mount tightener may allow a user to change the engagement between the clamp mount coupling and the clamp mount, thereby changing how hard it is to move the clamp with respect to the housing. The clamp mount may be coupled to a clamp ring that extends around the housing and allows for rotation of the clamp about the housing, thereby adding another degree of freedom for locating and positioning the clamp. A clamp extends from the clamp mount to a pair of clamp arms having a clamp opening therebetween. The clamp arms may form a cylindrical clamp opening therebetween for engagement around the rod portion of a fishing pole or fishing stand, for example. Turning of a clamp tightener may enable the clamp arms to be secured down around the fishing rod.

When the pivot arm rotates the fishing line will be pulled from the line wedge and therefore not interfere with reeling the fishing line in. In addition, when the fish bite indicator is coupled to a secondary object, picking up the fishing pole will release the fishing line from the line wedge and completely free the fishing pole from the fish bite indicator.

A button or switch, as used herein, is a user interface for activating a feature of the fish bite indicator, such as the record function, power on/off function, or recorded voice emitting function, and may be used interchangeably.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 20 shows a perspective view of an exemplary fish bite indicator with the clamp coupled to the clamp mount and in a closed position around a fishing rod.

FIG. 21 shows a perspective partial view of an exemplary fish bite indicator and the clamp coupled to the clamp mount and mount tightener to adjust the clamp mount pressure.

Figure 1:
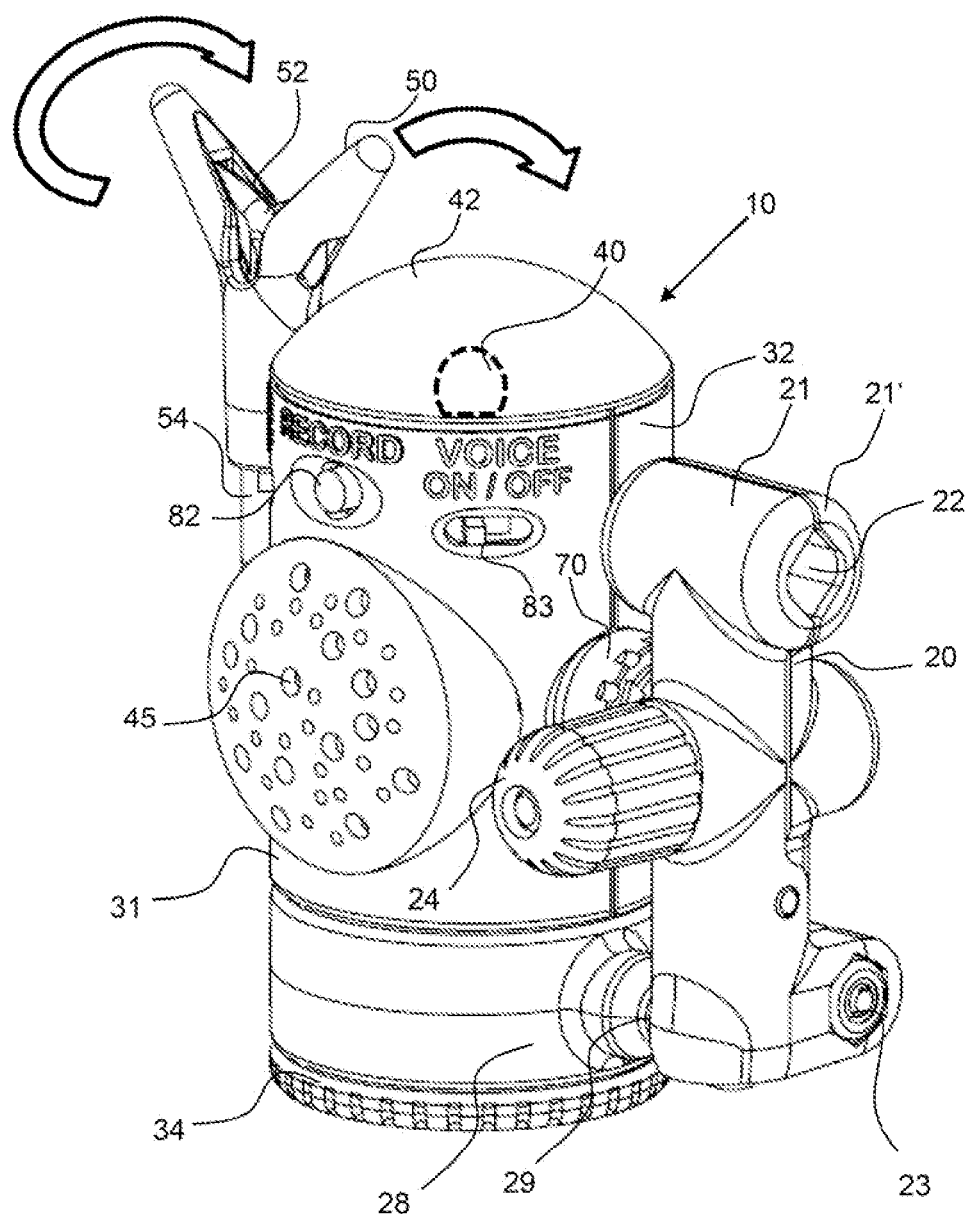
FIG. 1 shows a perspective front housing view of an exemplary fish bite indicator having a clamp and a line retainer that pivots when a fish pulls a fishing line configured therein to turn on an indicator, such as an indicator light and/or produces sound from the indicator speaker.
Figure 2:
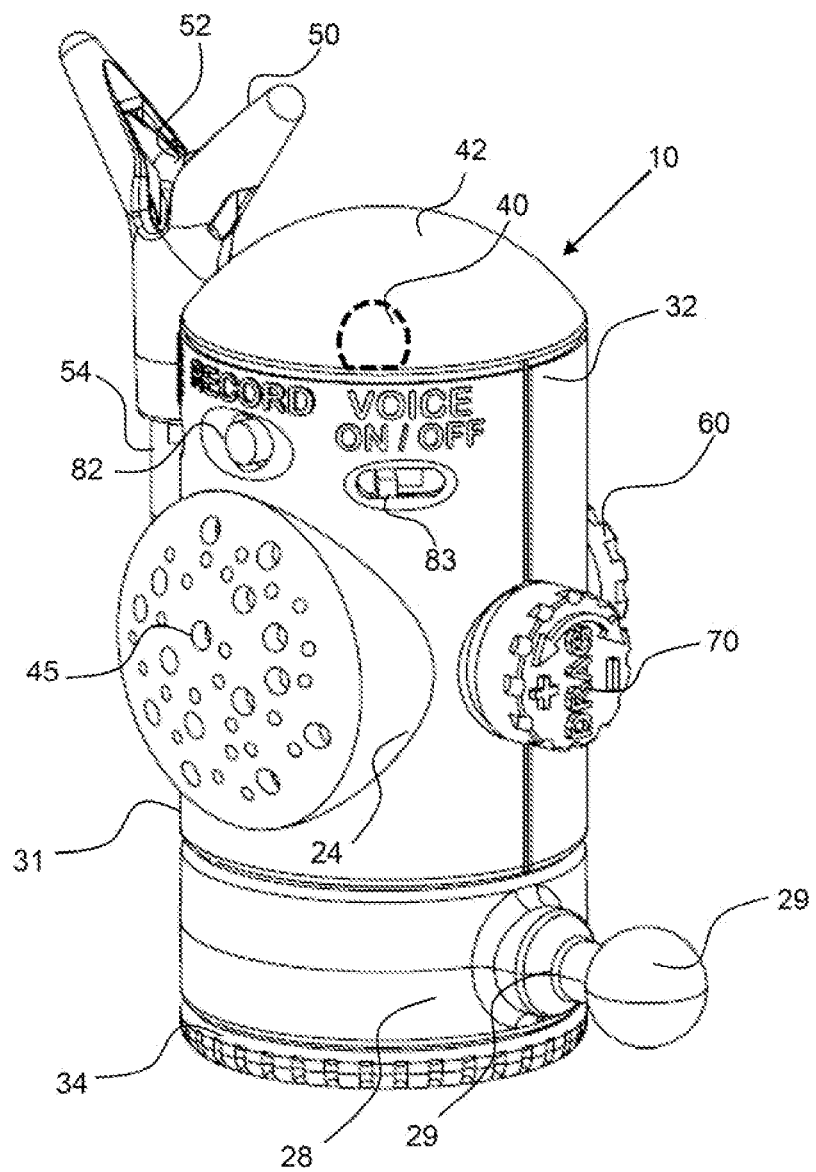
FIG. 2 shows a perspective view of the exemplary fish bite indicator shown in FIG. 1, with the clamp detached from the clamp mount.
Figure 3:
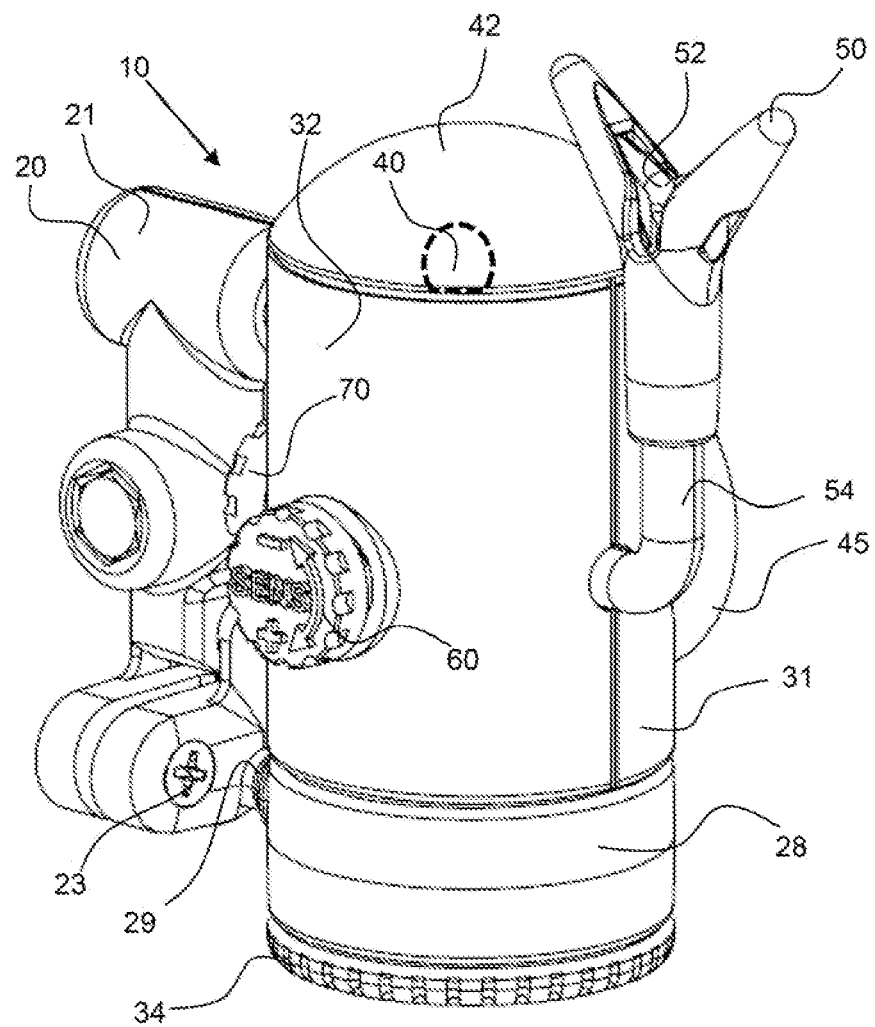
FIG. 3 shows a perspective back housing view of the exemplary fish bite indicator having a clamp and a line retainer that pivots when a fish pulls a fishing line configured therein to turn on an indicator, such as an indicator light and/or produces sound from the indicator speaker.
Figure 4:
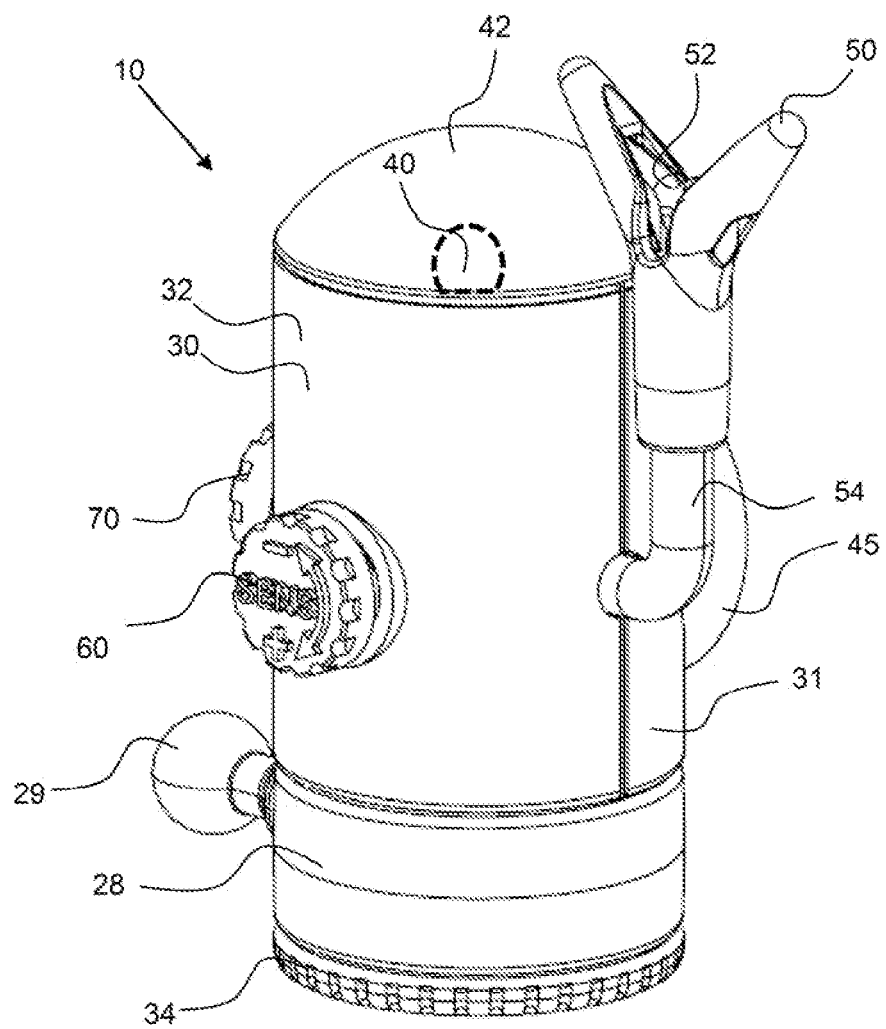
FIG. 4 shows a perspective view of the exemplary fish bite indicator shown in FIG. 3, with the clamp detached from the clamp mount.
Figure 5:
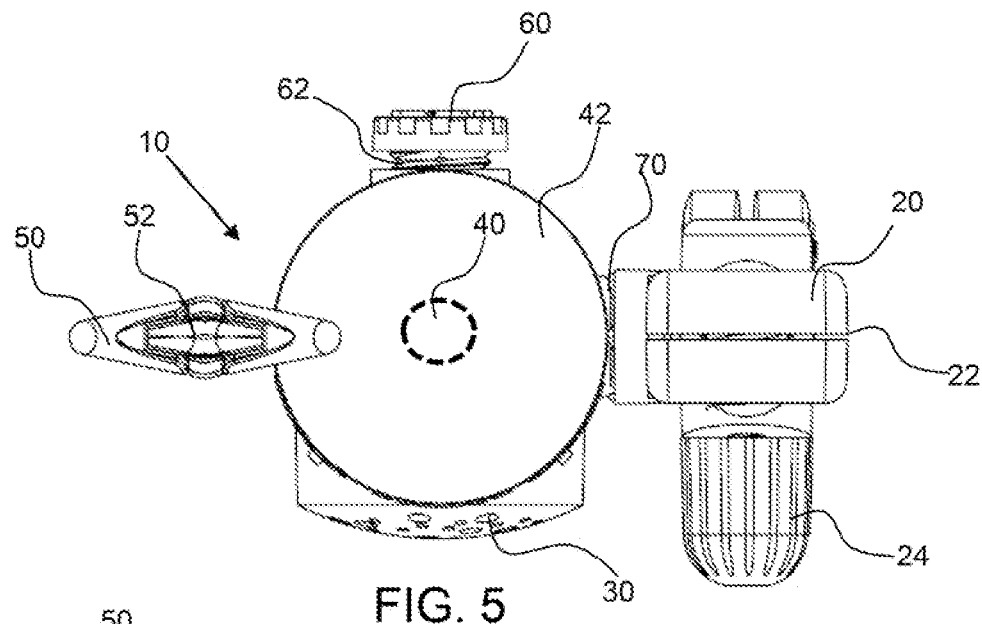
FIG. 5 shows a top view of the exemplary fish bite indicator.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Referring now to FIGS. 1 to 6, an exemplary fish bite indicator 10 has an indicator light 40, configured under a light cover 42, which may be translucent or transparent to allow the light emitted by the light to be seen. The exemplary fish bite indicator has an indicator speaker 45 that are configured to be activated when the line retainer 50 pivots downward, as indicated by the bold arrow, from a fish biting or pulling on the fishing line that is retained by the line retainer. The line retainer is coupled to the pivot arm 54 and when the pivot arm pivots, electrical contacts 80 coupled to the pivot arm inside of the housing 30 make contact with a circuit contact 66, an electrically conductive element, to complete the electrical circuit to initiate the indicator light and/or sound from the indicator speaker. A wire may extend from the electrical contacts to complete the circuit. A fishing line may be retained in the line wedge 52 configured in the line retainer. A line wedge may be an elastomeric material and the depth of insertion of the fishing line into the line wedge may adjust how easily the line will be pulled out by a fish bite. The line retainer may also swivel about the pivot arm to allow for disengaging the fishing line from the line wedge when an angler manipulates the fishing pole.

The exemplary fish bite indicator produces an alert sound from the indicator speaker and an alert light from the indicator light 40 when the pivot arm rotates an effective amount to cause electrical contacts to contact a circuit contact. The sound emitted may be an alarm sound, such as a buzz or beeping noise, or it may be a recorded sound, such as a voice or message. A user may activate the record switch 82 and record a phrase, such as "fish on," and then switch the voice on/off switch 83 to the on position to hear this phrase when a fish bites the line retainer in the line retainer. Also, the line retainer may comprise a glow-in-the-dark portion, such as the line wedge and/or the line retainer and when this glowing arm pivots due to a fish strike, it may be an initial visual alert that is noticed by the angler. An angler may use the motion of the glow-n-the-dark portion of the line wedge or line retainer for alerting them of a fish bite and may turn off the other electronic audible and visual alerts. A glow-in-the-dark portion of the line retainer which includes the line wedge may be phosphorescent. Phosphorescence is light emitted after exposure to radiation, or produced by something, such as a chemical reaction, that doesn't produce flame or heat. An example of phosphorescence is the light from a glow stick.

The exemplary fish bite indicator has a clamp 20 for coupling the fish bite indicator to the fishing rod or to a secondary item, such as a fish stand. The clamp has two clamp arms 21, 21' forming a clamp opening 22 for receiving the fishing pole or fish stand. A clamp tightener 24 may be manipulated to change the clamping force of the clamp and the clamp tightener shown is a clamp knob. The clamp may be detachable attachable to the housing 30 of the fish bite indicator and a clamp mount 29 may extend from the fish bite indicator, such as from a clamp ring 28 that is configured to rotate about the housing of the fish bite indicator to provide versatility in position of the clamp position. Also, as shown the clamp mount 29 is spherical, enabling multi-direction movement and rotation of the clamp 20 with respect to the clamp mount. A mount tightener 23, such as a bolt may be tightened to increase the interface force of the clamp on the clamp mount and therefore make it harder to manipulate the clamp with respect to the clamp mount.

Figure 6:
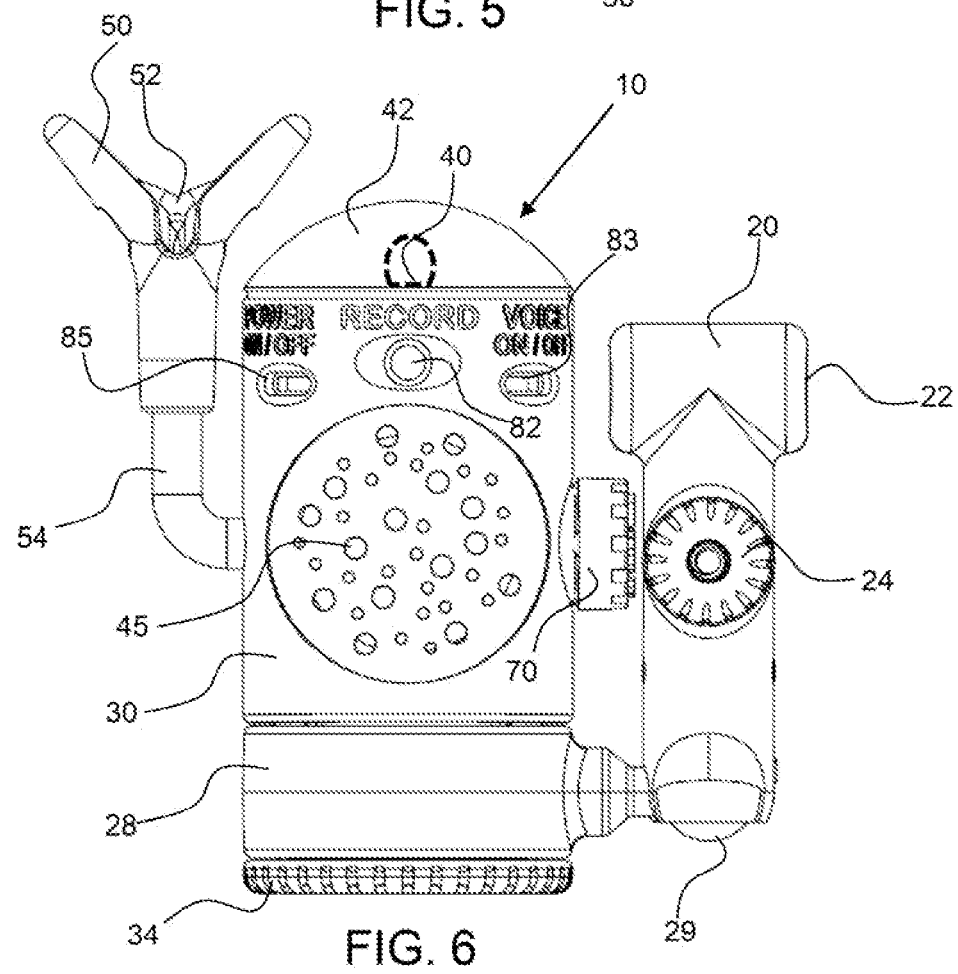
FIG. 6 shows a front view of the exemplary fish bite indicator.

The controls, battery and electronics are configured within the housing and a cap 34 seals the housing which may be water resistant or water proof. Seals such as gaskets and O-rings may prevent water entry into the housing and may be configured around the pivot arm as well as the drag and sensitivity knobs. The housing may have a front housing portion 31 and a back housing portion 32 that are coupled together to form an enclosure for the batteries and the electronics. As shown in FIG. 6, the fish bite indicator has an on/off switch 85 as well as a voice on/off switch 83.

Figure 7:
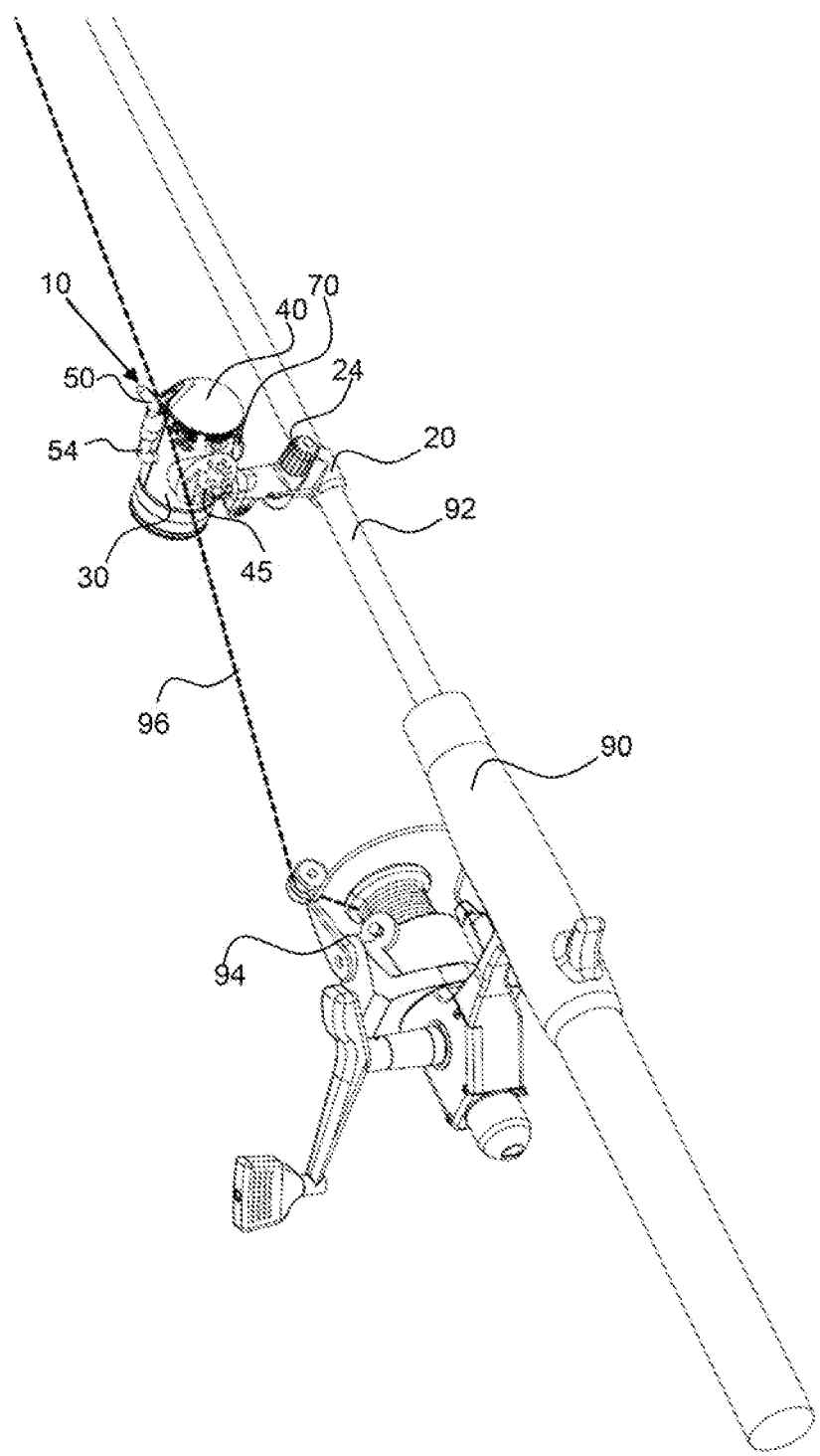
FIG. 7 shows the exemplary fish bite indicator coupled to a rod of a fishing pole by the clamp.

As shown in FIG. 7, an exemplary fish bite indicator 10 is coupled to the rod 92 of a fishing pole 90. The clamp 20 is configured around the rod and the fishing line 96 is retained in the line wedge of the line retainer 50. The fishing line extends from the reel 94 through the line retainer and through eyelets of the fishing pole. When the line is pulled by a fish, the line retainer will rotate activating the indicator speaker 45 and indicator light 40. The drag knob 70 may be turned to change how much force is required to rotate the pivot arm 54.

Figure 8:
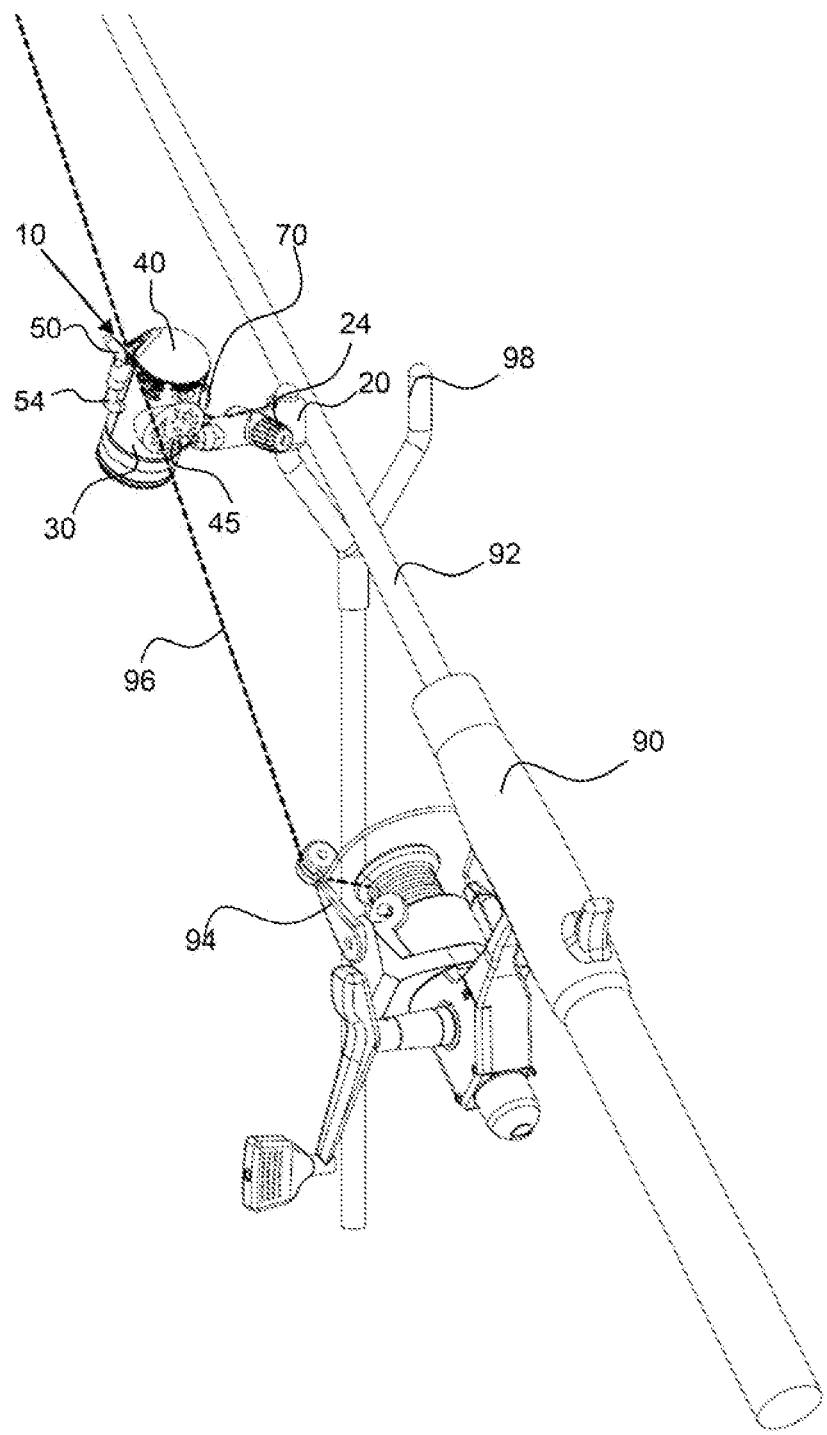
FIG. 8 shows the exemplary fish bite indicator coupled to a rod holder by the clamp.

As shown in FIG. 8, an exemplary fish bite indicator 10 is coupled to a rod stand 98 and configured to receive the fishing line 96 in the line retainer 50. The fishing pole 90 may be pulled up off of the rod stand 98 to free the fishing pole from the fish bite indicator for reeling in a fish. As shown, the clamp opening is configured around a vertical arm of the rod stand.

Figure 10:
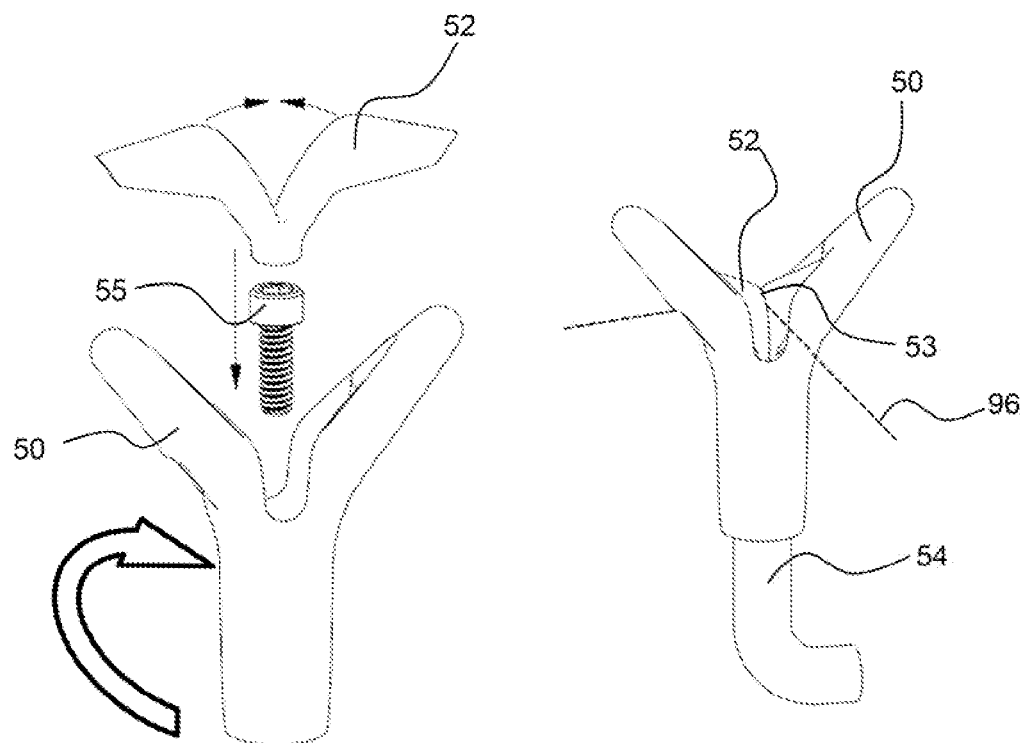
FIGS. 9 to 11 show an exemplary line retainer having a line wedge for retaining fishing line therein.
Figure 9:
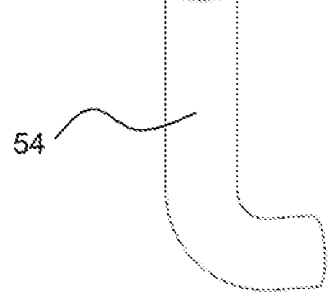
Figure 11:
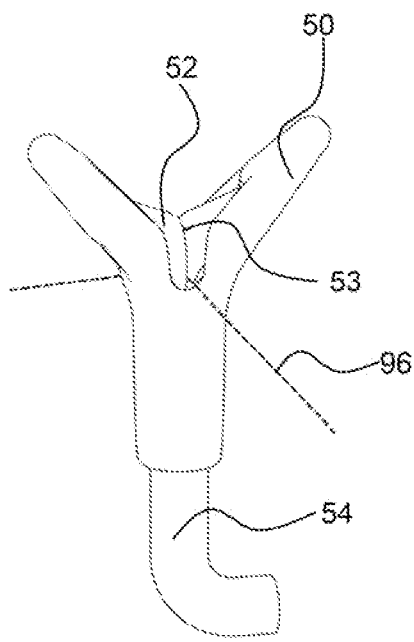

Referring now to FIGS. 9 to 11, an exemplary line retainer 50 has liner wedge 52 for retaining fishing line 96 therein. The line wedge 52 may be an elastomeric material that deforms around the fishing line inserted into the line wedge seam, a crease in the folded and retainer line wedge. As shown in FIG. 9, the line wedge has a shape configured for insertion into a recess in the line retainer. Also, FIG. 9 shows that the line retainer is retained to the pivot arm 54 by a pivot arm fastener 55 and the fastening arrangement may allow for swiveling of the line retainer about the pivot arm as indicted by the bold curved arrow. The pivot arm may have threads for receiving the threads of the pivot arm fastener, for example. As shown in FIG. 10, the fishing line 96 is inserted partially down into the line wedge seam 53 thereby making it easier for the fishing line to be released by a fish bite. As shown in FIG. 11, the fishing line 96 is inserted deeper into the line wedge seam thereby making it more difficult for the fishing line to be released from line retainer. An angler may take advantage of the variable line insertion depth into the line wedge seam to customize the fish bite indicator for the fishing conditions and preference. For example, when surf fishing, an angler may insert the fishing line deeper in the line wedge seam as the waves may produce periodic force on the line and the angler may not want the line to be pulled out of the line retainer due to the waves.

Figure 12:
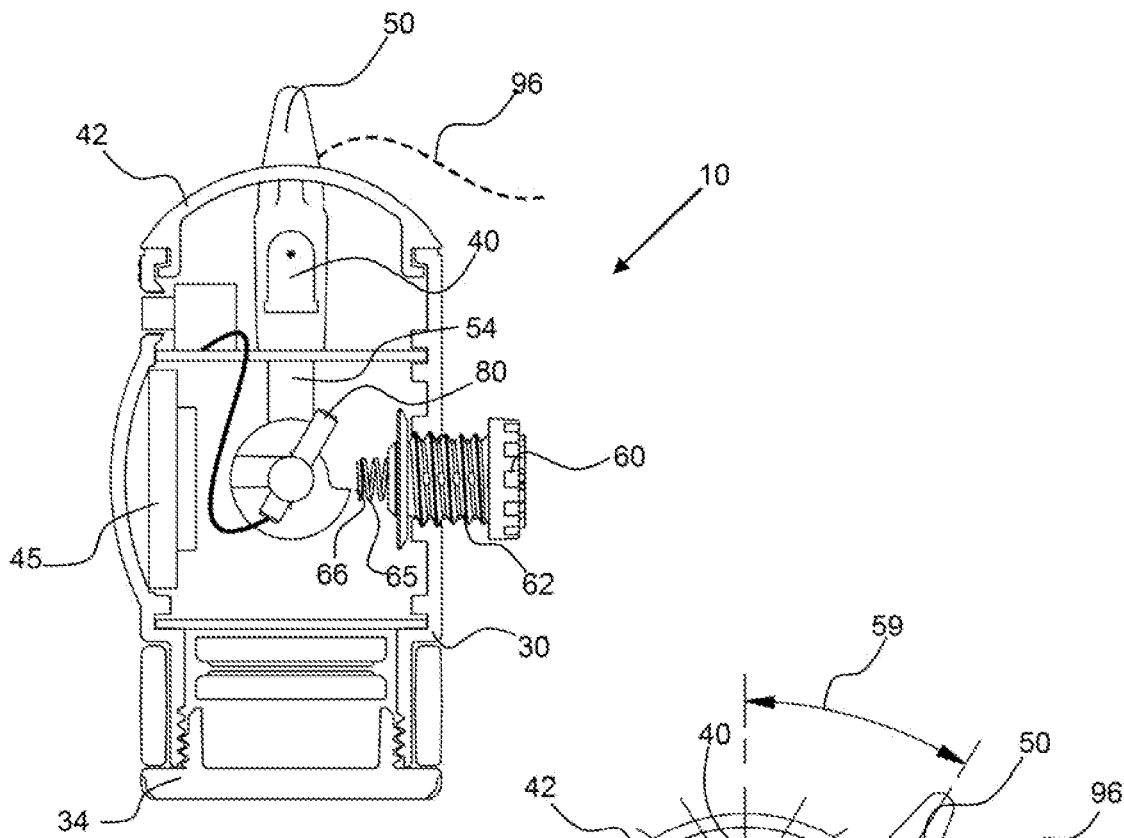
FIG. 12 shows a cross-sectional view of the exemplary fish bite indicator having a sensitivity knob configured to move a circuit contact spring toward and away from the electrical contacts, such that when the line retainer pivots the pivot arm rotates the electrical contacts to make contact with the circuit contact spring and initiate the light indicator and/or the indicator speaker.
Figure 13:
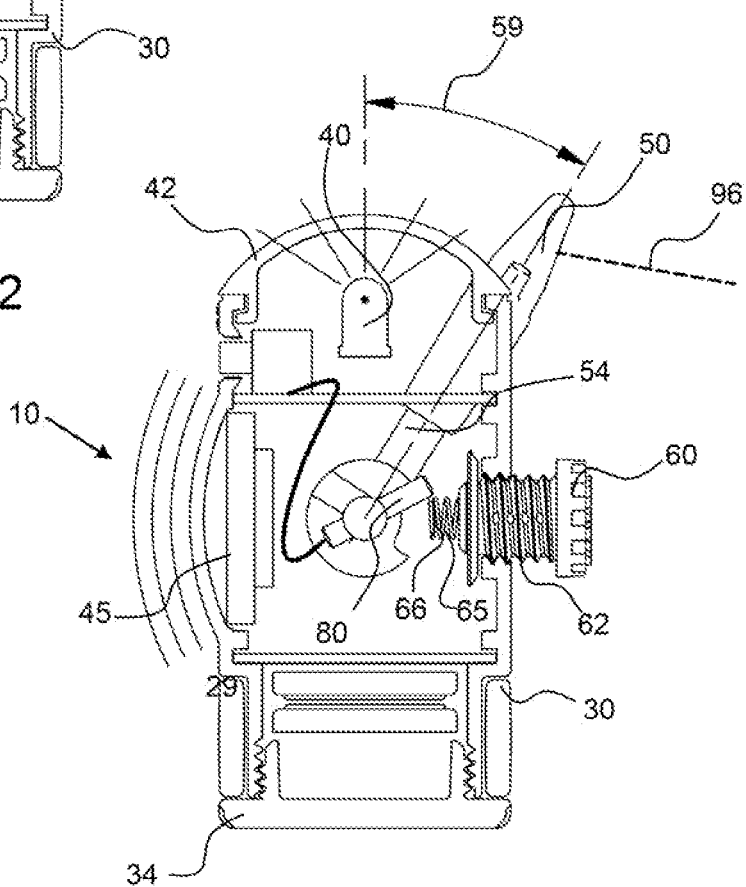
FIG. 13 shows the exemplary fish bite indicator shown in FIG. 12 with the electrical contacts making contact with the circuit contact spring to initiate the light indicator and the indicator speaker.

Referring now to FIGS. 12 to 15, an exemplary fish bite indicator 10 has a sensitivity knob 60 configured to move a circuit contact 66, a circuit contact spring 65, toward and away from the electrical contacts 80, to adjust how much rotation of the pivot arm is required to complete the electrical circuit and trigger the indicator light and/or indicator speaker. The sensitivity knob has threads 62 that engage with threads in the housing 30 and the circuit contact spring 65 is coupled to the extended end of the sensitivity knob. As shown in FIG. 12, the fishing line 96 is loose and the pivot arm is in a vertical position. As shown in FIG. 13, the fishing line is being pulled to rotate the pivot arm and thereby rotate the electrical contacts 80 to make contact with the circuit contact spring 65 to trigger the indicator light 40 and the indicator speaker 45 to produce a sound, a factory alert sound or a recorded alert sound. Note that users may record no sound if they do not want any audible alerts. Also note that the contact spring is configured to flex to soften the impact of the electrical contacts. It may not be desirable for there to be an abrupt hard stop when the electrical contacts rotate into contact with the circuit contact.

Figure 14:
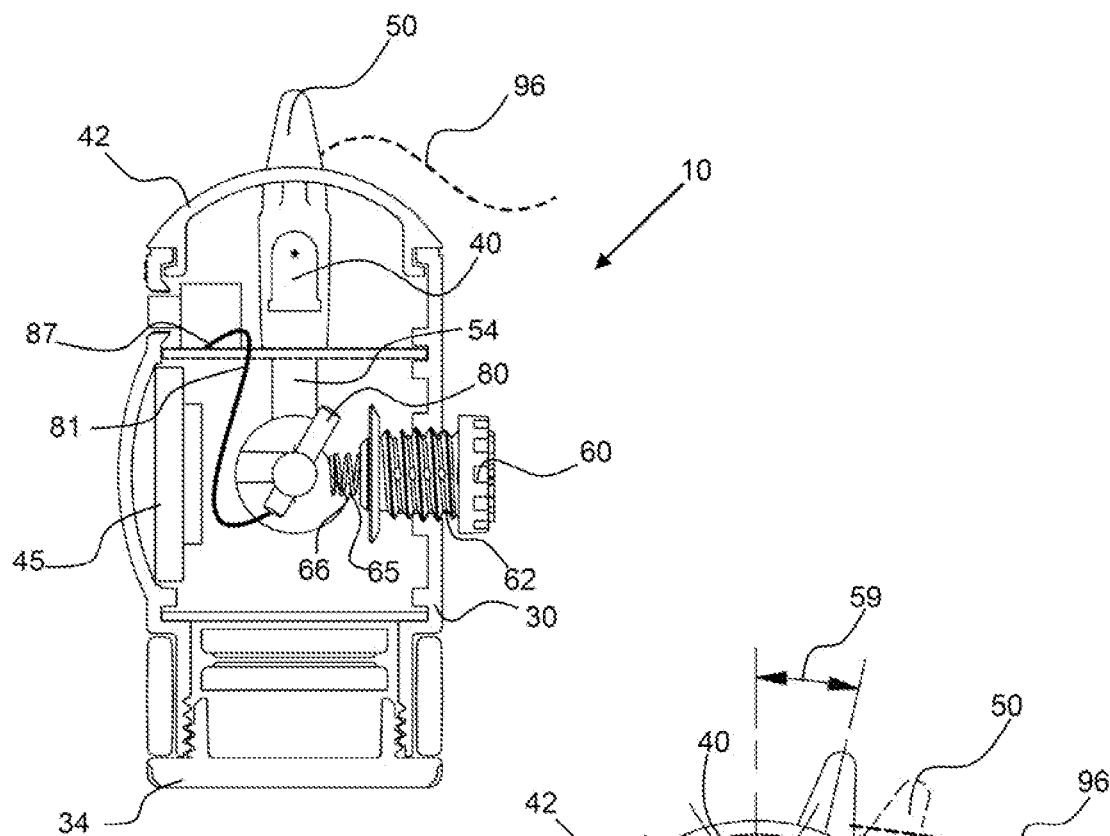
FIGS. 14 and 15 show a cross-sectional view of the exemplary fish bite indicator with the sensitivity knob now positioned for high sensitivity, requiring the line retainer to pivot less to initiate contact of the electrical contacts with the circuit contact spring to initiate the light indicator and the indicator speaker.
Figure 15:
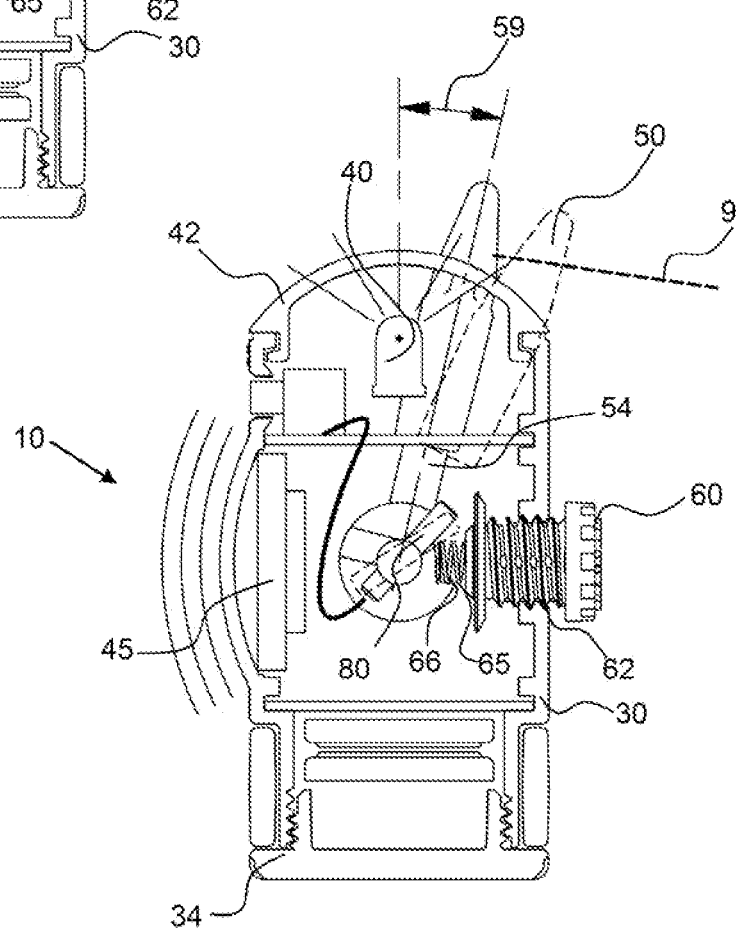

As shown in FIGS. 14 and 15, the fish bite indicator 10 is configured with the sensitivity knob 60 now positioned for high sensitivity, wherein the sensitivity knob has been screwed into the housing to move the circuit contact spring 65 closer to the electrical contacts 80 and thereby requiring the line retainer to pivot less to initiate contact of the electrical contacts with the contact spring. The indicator angle 59 is much less in FIG. 15 than in FIG. 13. Note that the drag knob may be manipulated to change the force required to rotate the pivot arm 54. Therefore, an angler may change both the indicator angle and the force required to reach this indicator angle separately. This separate adjustment capability works together and provides for customization of the fish bite indicator for the fish species sought and the fishing conditions and for personal preference. A wire 81 may extend from the electrical contacts 80 to complete the circuit 87.

Figure 16:
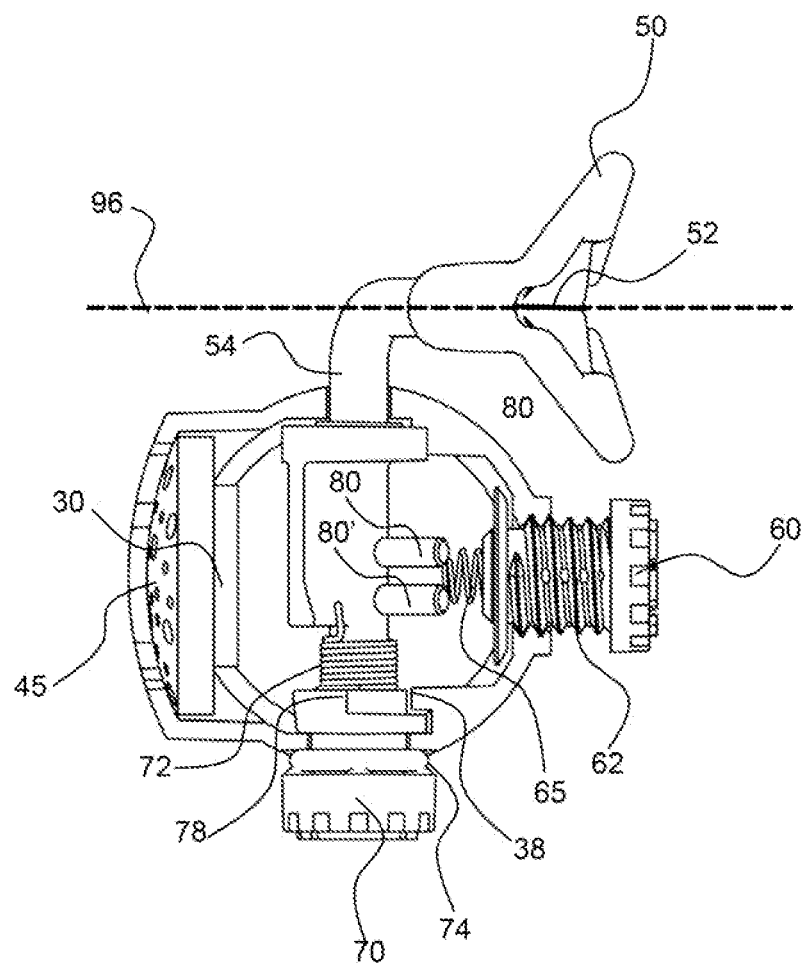
FIG. 16 shows a top cross-sectional view of the exemplary fish bite indicator having a drag knob configured to change the amount of force required to pivot the pivot arm by changing the torsional force of the drag spring.

As shown in FIG. 16, the exemplary fish bite indicator 10 has a drag knob 70 configured to change the amount of force required to pivot the pivot arm by changing the torsional force of the drag spring 72. The drag spring may be a coil spring that is wound when the pivot arm rotates and force may be changed by changing the amount of winding of the drag spring by rotating the drag knob. Also, the pivot arm 54 has a pivot arm stop 58, such as a raised portion or brace that is configured to interface with the housing stop 38 when the pivot arm rotates to certain maximum indicator angle.

Figure 17:
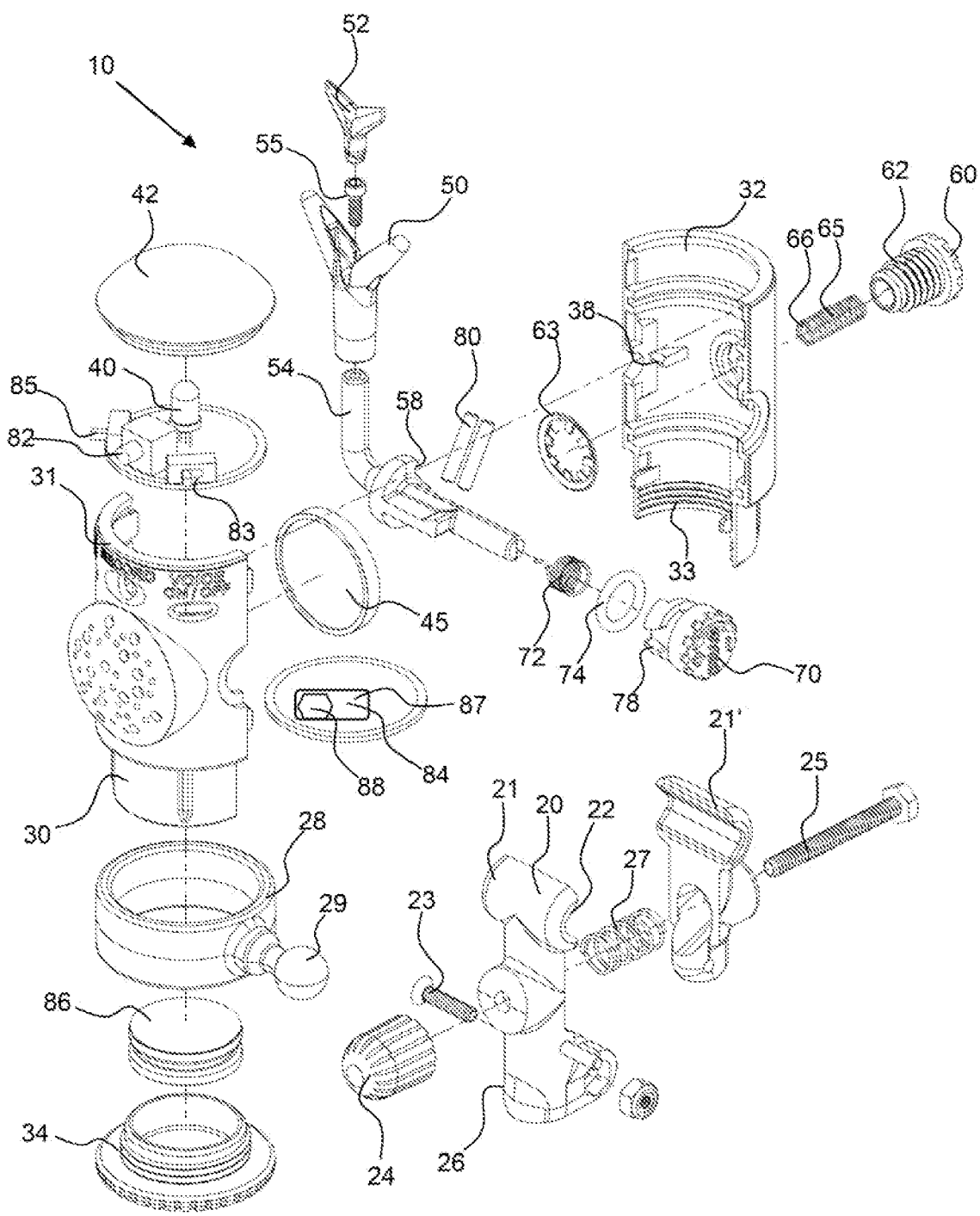
FIG. 17 shows an exploded view of the exemplary fish bite indicator.

FIG. 17 shows an exploded view of the exemplary fish bite indicator 10. As described herein, the fish bite indicator may be water resistant or waterproof and may employ seals to prevent water ingress into the housing 30. As shown, a drag knob O-ring 74 is configured around the drag knob and the pivot arm. The O-ring may provide resistance to retain the drag knob in a set position to prevent the knob from rotating due to the torsional force exerted by the spring. The O-ring may also provide a seal between the drag knob and the interior of the housing. The battery 86 is configured within the housing 30 and is secured in place by the cap 34. The cap has threads that thread into the housing threads 33. A retaining ring 63 is configured to extend around the sensitivity knob threads 62, to retain it in a preferred position. A circuit board 84, such as a printed circuit board, is configured to control the functions of the fish bite indicator and may include the memory 88 for the recorded alert sound. The circuit board 84 is coupled with the electrical circuit 87 that receives power from the battery 86. The electrical circuit is closed when the electrical contacts contact the electrically conductive circuit contact 66. The current of the electrical circuit will flow through the electrical contacts when the electrical contacts make contact with the circuit contact. Current may flow trough one electrical contact, through the circuit contact and back through the second electrical contact to complete the circuit. A wire may extend from each of the electrical contacts and be part of the electrical circuit.

Figure 18:
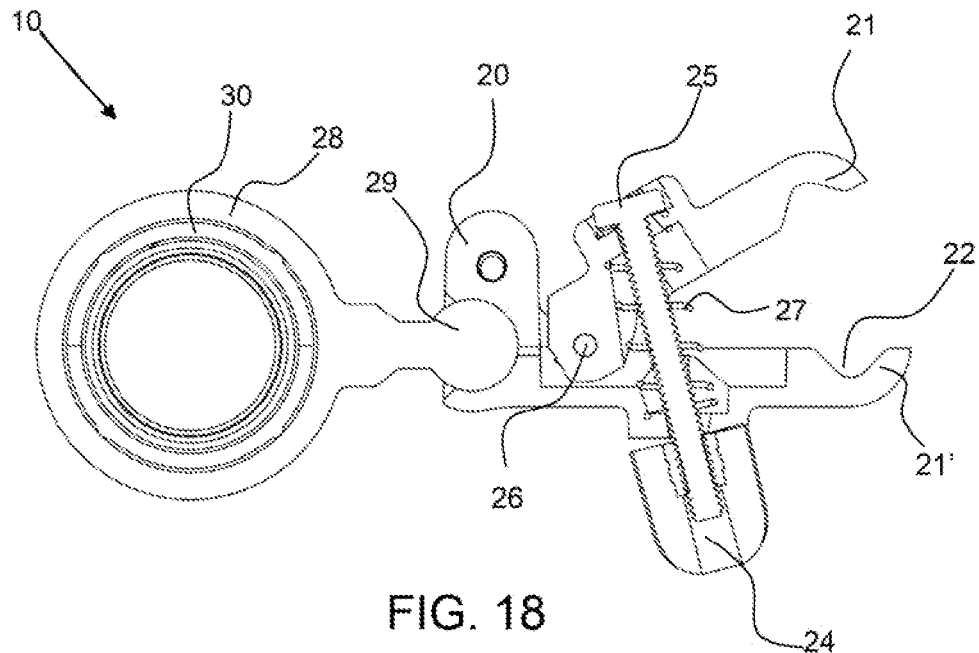
FIG. 18 shows a cross-section view of the exemplary fish bite indicator with the clamp coupled to the clamp mount and with the clamp arms in an open position.
Figure 19:
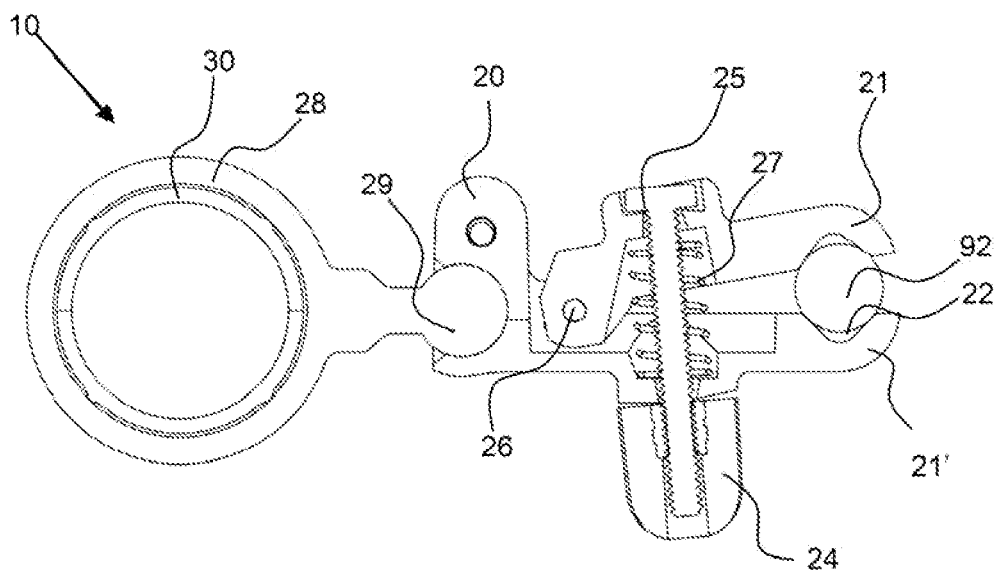
FIG. 19 shows a cross sectional view of the exemplary fish bite indicator with the clamp coupled to the clamp mount and the clamp arms in a closed position around a fishing rod.

Referring now to FIGS. 18 and 19, the exemplary fish bite indicator 10 is configured with the clamp 20 coupled to the clamp mount 29. As shown in FIG. 18, the two clamp arms 21, 21' are in an open position with clamp arm 21 pivoted away from clamp arm 21' around the clamp pivot 26. As shown in FIG. 19 the clamp is in a closed position around a fishing rod 92. The clamp tightener 24, a knob, is used to draw the two clamp arms together, and compress the clamp spring 27. The clamp tightener 24 has threads for mating with a clamp bolt 25. The clamp mount 29 is coupled with the clamp ring 28 to allow the clamp mount to rotate about the housing 30. A fishing rod 92 is configured and retained in the claim opening 22, as shown in FIG. 19. Note that the clamp mount 29 is coupled to the clamp ring 28 that extends around the housing 30.

Referring now to FIGS. 20 and 21, an exemplary fish bite indicator is configured with the clamp 20 coupled to the clamp mount 29 and is in a closed position around a fishing rod 92. The force to move the fish bite indicator with respect to the clamp can be adjusted by the tightening or loosening the mount tightener 23, or bolt that changes the interface between the clamp and clamp mount. FIG. 21 shows a perspective partial view of an exemplary fish bite indicator and the clamp coupled to the clamp mount and mount tightener to adjust the clamp mount pressure.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. A fish bite indicator comprising:
   a) a housing;
   b) a pivot arm that extends out from the housing and is configured to pivot with respect to the housing when a fish pulls a fishing line;

c) a Y-shaped line retainer coupled to said pivot arm and configured to retain a fishing line therein, said line retainer comprising a line wedge to retain the fishing line;
wherein the line wedge is folded and retained in the line retainer to form a line wedge crease that is configured to retain the fishing line therein;
wherein the line wedge is soft elastomeric material having a shore OO value of 100 or less;
wherein a position of the fishing line in the line wedge crease is adjustable, wherein a deeper position of the fishing line into the line wedge crease requires more force to release said fishing line from the line wedge; and
wherein the line retainer is configured to swivel about the pivot arm to allow for disengaging the fishing line from the line wedge when an angler manipulates a fishing rod with said fishing line attached thereto;
d) an indicator;
e) a battery;
f) a pair of electrical contacts configured inside of the housing and coupled to said pivot arm and coupled to said battery; and
g) a circuit contact configured to contact the electrical contacts when the pivot arm rotates to an indicator angle to complete an electrical circuit between the electrical contacts and the battery;
wherein the indicator is configured to turn on when the pivot arm rotates to said indicator angle to complete said electrical circuit;
h) a drag knob coupled to the pivot arm comprising a torsional spring;
wherein said torsional spring is configured to wind about the pivot arm when the drag knob is turned to adjust the tension of the fishing line required to rotate the pivot arm to said indicator angle; and
i) a clamp configured to couple the fish bite indicator to said fishing rod or a secondary fixed item;
wherein the pivot arm is configured to rotate with respect to the housing when the fishing line is pulled to release the fishing line from the line wedge.

2. The fish bite indicator of claim 1, wherein the indicator is an indicator light configured to produce a light alert.

3. The fish bite indicator of claim 1, wherein the indicator is an indicator speaker configured to produce an audible alert.

4. The fish bite indicator of claim 1, wherein the battery is configured inside of the housing.

5. The fish bite indicator of claim 1, further comprising a sensitivity knob coupled to the housing and configured to move into and out of the housing to change a position of the circuit contact and thereby change the indicator angle.

6. The fish bite indicator of claim 5, wherein the sensitivity knob comprises threads configured to engage with threads in the housing and wherein the indicator angle is adjustable by screwing the sensitivity knob into and out of the housing.

7. The fish bite indicator of claim 5, wherein the circuit contact is a helical spring that extends from the sensitivity knob and wherein the helical spring is configured to flex when the pair of electrical contacts contact the helical spring.

8. The fish bite indicator of claim 7, wherein the torsional spring of the drag knob is configured to wind about the pivot arm when the drag knob is turned to adjust the drag force.

9. The fish bite indicator of claim 1, wherein the line wedge is glow-in-the-dark.

10. The fish bite indicator of claim 1, wherein a portion of the line retainer is a glow-in-the-dark material.

11. The fish bite indicator of claim 1, wherein the indicator is an indicator speaker and wherein the fish bite indicator further comprises:
a sound recording memory, and
a record switch configured to record a recorded indicator sound in the sound recording memory.

12. The fish bite indicator of claim 11, further comprising a voice on/off switch, wherein in an on position, the recorded indicator sound is produced by the speaker when the pivot arm rotates to said indicator angle.

13. The fish bite indicator of claim 11, further comprising a voice on/off switch, wherein in an off position, a factory indicator sound is produced by the speaker when the pivot arm rotates to said indicator angle.

14. The fish bite indicator of claim 1, wherein the clamp comprises a pair of clamp arms having a clamp opening therebetween and a clamp knob to adjust the clamp opening around said fishing pole.

15. The fish bite indicator of claim 1, wherein the fish bite indicator further comprises:
a clamp ring that extends around the housing and wherein the clamp is coupled to the clamp ring, and wherein the clamp ring is configured to rotate about the housing to adjust a position of the clamp with respect to the housing.

16. The fish bite indicator of claim 15, wherein the clamp ring comprises a clamp mount coupled thereto and wherein the clamp is detachably attachable to the clamp mount.

* * * * *